Dec. 9, 1969  L. W. PROCOPIO, JR  3,483,561
DIRECTION FINDING ANTENNA
Filed July 23, 1968  2 Sheets-Sheet 1

INVENTOR.
LEO W. PROCOPIO JR.
BY Harry A. Herbert Jr.
Willard R. Matthews Jr.
ATTORNEYS

United States Patent Office 3,483,561
Patented Dec. 9, 1969

3,483,561
DIRECTION FINDING ANTENNA
Leo W. Procopio, Jr., Philadelphia, Pa., assignor to the United States of America as represented by the Secretary of the Air Force
Filed July 23, 1968, Ser. No. 746,819
Int. Cl. G01s 5/02
U.S. Cl. 343—118     7 Claims

ABSTRACT OF THE DISCLOSURE

This invention comprehends a direction finder having a circularly disposed aerial antenna array and a pseudo-random phase shifting circuit. The antenna aerial pattern is electronically rotated by commutating the system phase shift program. The pseudo-random phase shifting circuit renders the direction finder receive pattern non-distinguishable. A tapped delay line correlator having complex tap weights is provided that matches the pseudo-pattern generated by the antenna array. The correlator produces compressed beams for all directions in space as the phase shift program is commutated. Means for changing the complex tap weight are also provided in order to adapt the system to various frequencies.

BACKGROUND OF THE INVENTION

This invention relates to direction finders and in particular to direction finding system having circularly disposed aerial antenna arrays and means for electronically rotating the aerial pattern generated thereby.

The rotatable loop antenna represents the earliest and simpliest type of direction finder. It was soon recognized, however, that such a device was not suitable for use on signals arising from unknown elevation angles and of mixed polarization.

The so-called Adcock direction finder was subsequently developed and proved to be a substantial improvement over the loop antenna device. The standard Adcock direction finder has four identical vertical aerial elements and signals from these aerials are brought by identical feeders to a central point where difference ratios are measured by a goniometer and a single channel receiver. Susceptability to site errors and polarization errors together with losses in the goniometer led to the development of other types of direction finders however.

These later types of direction finders took the form of mechanically and electronically commutated circularly disposed aerial antenna arrays. The Wullenweber system is representative of a mechanically commutated circular type direction finder. The principal drawbacks of such a system are its wide bandwidth requirement and its dependence upon a goniometer for signal resolution.

A detailed review of the state-of-the-art of direction finders is presented by P. J. D. Gething in High-Frequency Direction Finding published in IEE Proceedings, vol. 113, January 1966.

To date, most advances in direction finding technology have been accomplished by various tradeoffs, and all known systems include one or more of the disadvantages mentioned. Improved resolution, solution of the wide bandwidth requirement problems, and the development of devices having non-distinguishable receiving patterns remain unachieved objectives of direction finder designers.

The present invention is directed toward furthering the state-of-the-art in these and other areas.

SUMMARY OF THE INVENTION

Theoretical evaluation of circular array antennas has developed equations that predict angular resolution to be dependent on the auto-correlation function of the beam pattern and not on the characteristic width of the pattern itself and, further, that resolution can be obtained from random patterns.

These principles have been utilized in the present invention to provide a high resolution electronically commutated circular array direction finder having a non-distinguishable receive pattern.

A typical embodiment includes a plurality of vertical aerial antenna elements arranged in a circular configuration and connected to an R.F. receiver. Each antenna element is provided with a phase shifting device. A pulse sequence generator in combination with a tapped delay line sequentially activates the phase shifters at a predetermined cyclic rate. This cyclic frequency should have a period that is equal to or less than the reciprocal of the signal bandwidth. The output of the receiver is fed to a weighted tapped delay line and a summing network. The signals resolved by this network can be displayed or utilized in any conventional manner. The invention also comprehends a tap weight adapter for use in combination with the resolving circuits of the system to effect broadband response capability.

It is a principal object of the invention to provide a new and improved direction finding system of the electronically commutated circular array type that has a non-distinguishable receive pattern.

It is another object of the invention to provide an electronically commutated circular array direction finder having improved resolution characteristics.

It is another object of the invention to provide an electronically commutated circular array direction finder that has very broadband response capability.

These, together with other objects, advantages and features of the invention will become more apparent from the following detailed description when taken in conjunction with the illustrative embodiments in the accompanying drawings.

DESCRIPTION OF THE PREFERRED EMBODIMENTS

Figure 1:
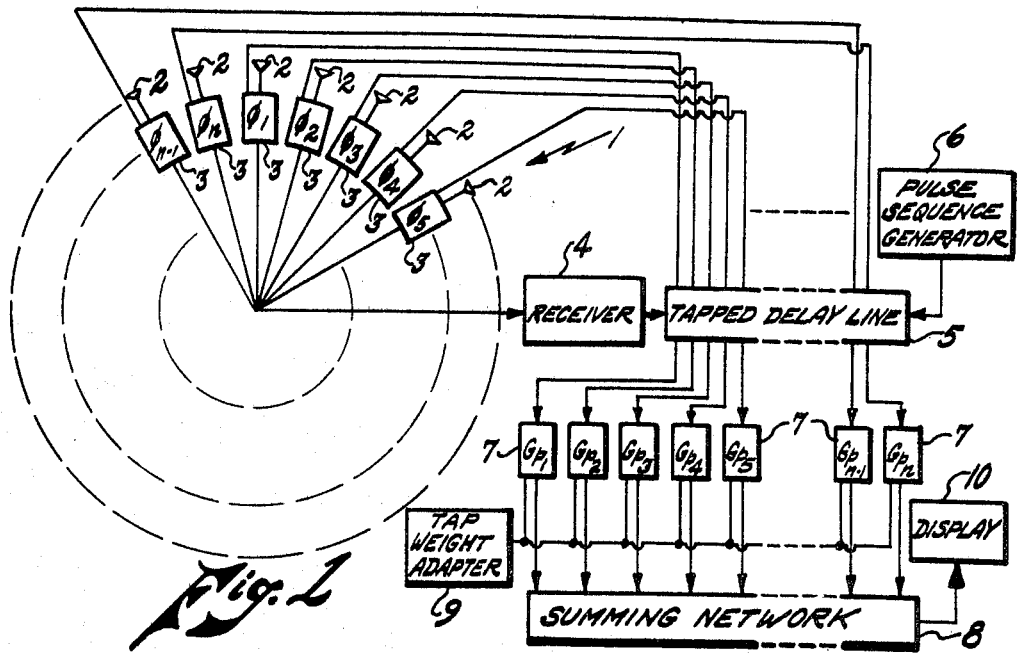
FIGURE 1 illustrates in block diagram form a direction finder incorporating the principles of the invention.

The basic principles of the invention are derived from a theoretical evaluation of certain antenna configurations. Inasmuch as the complex tap weights of the system correlator are based upon certain equations evolved from such theoretical evaluation, it is herein summarized.

Formulation of the integrated mean squared difference criterion for antenna arrays fundamentally affects the form of the angular ambiguity function and the antenna processes which are implied from it. In the formulation of such a criterion for a physically rotated antenna array, the integrated squared difference for two signals $S_1$ and $S_2$, arriving from angles $\theta$ and $\theta+\Delta\theta$ with respect to a normal reference axis, can be written in the form:

$$\epsilon^2 = \iint |S_1 - S_2|^2 d\theta dt \tag{1}$$

The signals $S_1$, $S_2$ in this case represent the total signals received by the aperture from directions $\theta$ and $\theta+\Delta\theta$, respectively, and the equation prescribes that the magnitude of the difference be squared and integrated over all angles of the antenna pattern and over all time elements of the signal structure. When this equation is expanded, it gives rise to three terms:

$$\epsilon^2 = \iint |S_1|^2 d\theta dt + \iint |S_2|^2 d\theta dt - 2Re \iint S_1 S_2^* d\theta dt \tag{2}$$

The first two are proportional to total signal energy and are constant. The third term is the ambiguity function and is the function which must be minimized so as to maximize the resolution or the signal difference $\epsilon^2$. The ambiguity function of the first kind is then $$\Phi = \iint S_1 S_2^* d\theta dt \tag{3}$$

For good resolution, the ambiguity function should have a minimum value for all finite separation angles $\Delta\theta$, and a peak value for $\Delta\theta=0$ (corresponding to the fact that targets at the angular position are indistinguishable). Since the signal $S_1$ in this case represents the total antenna output, it can be written in the form $$S_1 = a(t) e^{i\omega_0 t} G(\omega, \theta) \tag{4}$$

where $a(t)$ is the signal modulation, $\omega_0$ is the carrier frequency, and $G(\theta)$ is the pattern amplitude in direction $\theta$. For signals from moderate to small bandwidth, the dependence of the pattern shape on frequency can be neglected. In this case the signal structure and pattern structure become separable terms in the ambiguity function, and the ambiguity function becomes the product of the range (time) and angle ambiguity functions. Suppressing the time dependence, the angle ambiguity function becomes $$\Phi_1(\Delta\theta) = \int G(\theta) G^*(\theta + \Delta\theta) d\theta \tag{5}$$

The significance of this equation lies in the fact that it predicts angular resolution to be dependent on the autocorrelation function of the beam pattern, and not on the characteristic width of the pattern itself. Equivalently, this predicts that resolution can be obtained from random or noiselike patterns, providing these patterns have the necessary spatial bandwidth commensurate with the desired resolution. Moreover, the correlation process requires knowledge of the pattern at all angles of interest. The physical implication is that the antenna pattern should be rotated so that signals from all portions of the pattern can be gathered for the correlation process. This pattern rotation can be achieved for all antennas by a simple mechanical rotation. For circular arrays mechanical rotation is also equivalent to electronic rotation of the beam. Hence, for actual processing systems, it will be seen that the ambiguity formulation of physically rotated antennas is peculiarly adapted to circular arrays.

In the case of electronic beam rotation, the integrated mean squared difference criterion is stated in the form:

$$\epsilon^2 = \iint |S_1 - S_2|^2 dx dt \tag{6}$$

where $S_1$ is the signal received at a point $x$ in the aperture from a source at angle $\theta$. The prescription now indicates for signals $S_1(x, \theta)$ and $S_2(x, \theta)$ that the squared magnitude of the difference over all times and all aperture positions be integrated. In this case, the ambiguity function is $$\Phi = \iint S_1 S_2^* dx dt \tag{7}$$

and the ambiguity function is angle dependent.

Assuming a linear array for purposes of simplicity, and suppressing the time dependence as before, the signals $S_1$ and $S_2^*$ can be written $$S_1 = I(x) e^{ikxu}$$
$$S_2^* = I^*(x) e^{-ikx(u+\Delta u)} \tag{8}$$

where the substitution $u = \sin \theta$ has been made, $\theta$ is the angle off the normal to the array, $k = 2\pi/\lambda$, and $I(x)$ is the complex illumination function of the aperture. The angular separation in $u$ space is denoted as $\Delta u$. The angular ambiguity function is therefore of the form:

$$\Phi_2(\Delta u) = \int |I(x)|^2 e^{ikx\Delta u} dx \tag{9}$$

This, now, can be written in a form similar to that of Equation 5 by noting that the pattern function is:

$$G(u) = \int I(x) e^{ikxu} dx \tag{10}$$

and hence $$\int_{-\infty}^{\infty} G(u) G^*(u + \Delta u) du =$$
$$\iiint_{x_1 x_2 = -\infty}^{\infty} I(x_1) I^*(x_2) e^{ik(x_1 - x_2)u} e^{-ikx_2 \Delta u} dx_1 dx_2 du$$
$$= \int |I(x)|^2 e^{-ikx\Delta u} dx \tag{11}$$

Therefore, the equivalent form for the angular ambiguity function of the second kind is:

$$\Phi_2(\Delta u) = \int G(u) G^*(u + \Delta u) du \tag{12}$$

The significance of this form of the ambiguity function is that it implies electronic sweeping of the antenna pattern since the integration is over the variable $u$. That this is so can be seen from the equation for an electronically swept pattern:

$$G[u(t)] = \int I(x) e^{ikxu_0} e^{-ikxdt} dx$$
$$= \int I(x) e^{ikx(u_0 dt)} dx = \int I(x) e^{ikxu(t)} dx \tag{13}$$

where the linear phase program $e^{-kx_a t}$ provides electronic beam motion. The ambiguity function (12) is then peculiar to electronically scanned line sources, and provides a correlation principle for these cases.

The general configuration of a circular array embodying the principles of the invention is shown in FIGURE 1. In this embodiment, a phase shifter 3 follows each radiator element 2 and the outputs from all radiator elements are combined at RF and fed into a single R.F. receiver 4. Typically, the phase shifters could be of a very simple digital type, say a number of stripline channels controlled by diode switches so that the signal could be switched from one line to one other depending on which diodes were turned on. Phase shifters of this type are well known in the art and are exemplified by the devices disclosed by B. K. Nelson in U.S. Patent 3,295,138 entitled Phased Array System issued Dec. 27, 1966. For a binary phase shifter, for example, the array could be programmed with a sequence of 0 and $\pi$ phase shifts arranged in some pseudo-random fashion. Such a phase distribution would, of course, create a random noise-like azimuth pattern. By commuting the phase shift distribution about the array, the pattern will appear to rotate in space without change of shape. Hence a signal received from a particular azimuth will appear at the output of the receiver array, modulated with the form of the pseudo-random pattern. Generally, the pattern will be rotated at a very rapid rate so that coherence can be maintained over each portion of the signal structure containing the pattern modulation. Hence, the period of rotation will be less than or equal to the reciprocal of the signal bandwidth. With diode controlled phase shifters extremely rapid scanning approaching nanosecond periods is possible, and rotation periods proportional to the reciprocal bandwidth are well within the state of the art.

The pattern modulated signal appearing at the receiver output can be compressed with a single tapped delay line correlator 5, and hence will provide resolution for all azimuth directions as a function of time. The time delays between successive peaks of the correlator output will be proportional to the azimuth angular separations between the sources in the far field.

Because of the wideband pattern modulation applied to the incoming signal, the receiver bandwidth is made commensurately larger. This allows more noise to enter the receiver and hence the signal-to-noise ratio is degraded. However, the correlation process results in a compression of the pattern modulation, and the signal level will be increased by the collapse ratio. At the output of the compression filter, the signal-to-noise ratio will be restored.

Since the filter output displays all azimuth beams as a function of time, the time axis of a display unit 10 will be calibrated in azimuth angles. Attention can be focussed on the signal arriving from a particular azimuth by use of an "angle gate" (not shown), which automatically blanks out all beam positions but the ones of interest. This procedure would be similar to use of a "range" gate in conventional radar, where attention is focussed only on those signals arriving from a particular range interval.

The signals for controlling phase shifters 3 are delivered by pulse sequence generator 6 and are arranged as a sequence of pulses which either activates or does not activate a phase shifter. The sequence is fed into tapped delay line 5, the taps of which are connected to the successive phase shifters about the circle. As the pulse sequence moves through the line, control signals at the phase shifters will appear to commute about the array.

The signal correlating stage of the direction finder comprises tapped delay line 5 (which performs the dual function of pulse compression and pulse sequence distribution), complex weights 7, summing networks 8, and tap weight adaptor 9.

The circular array produces a pattern in the equitorial plane which is very frequency sensitive. Hence, bandwidth is an important consideration, especially in radio direction finding applications where wideband signal searching is often required. The shape of the pseudo-random pattern created by the circular array will change with frequency, and hence the nature of the correlator required to perform pattern compression will change. The means for achieving the required variable processor lies in use of the adaptive correlator principle. In this case, measurements are made of the new pattern shape produced in each frequency band, and the complex conjugate references are generated and stored. On command and corresponding to the frequency band being searched, the proper pattern waveform is read out from storage and applied to the taps of the adaptive correlator. In this condition the correlator is able to compress and form beams at all azimuth at the required search frequency.

The form of the processor to achieve correlation of the antenna pattern can be inferred directly from Equation 5 or 12 for the ambiguity functions. For example, in the case of the ambiguity function of the first kind this can be seen by approximating the integral by a discrete summation. Letting the variable $\theta = p\delta\theta$, there results:

$$\Phi(\Delta\theta) = \sum_p G(p\delta\theta) G^*(p\delta\theta + \Delta\theta) \qquad (14)$$

In this form the correlation can be seen to be the output of a tapped delay line filter whose taps have the complex weights $G(p\delta\theta)$. The input signal consists of the samples of the scanned antenna pattern $G^*(p\delta\theta + \Delta\theta)$. The general processor is shown in FIGURE 1 as tapped delay line 5, complex weights 7 and summing network 8.

Figure 2:
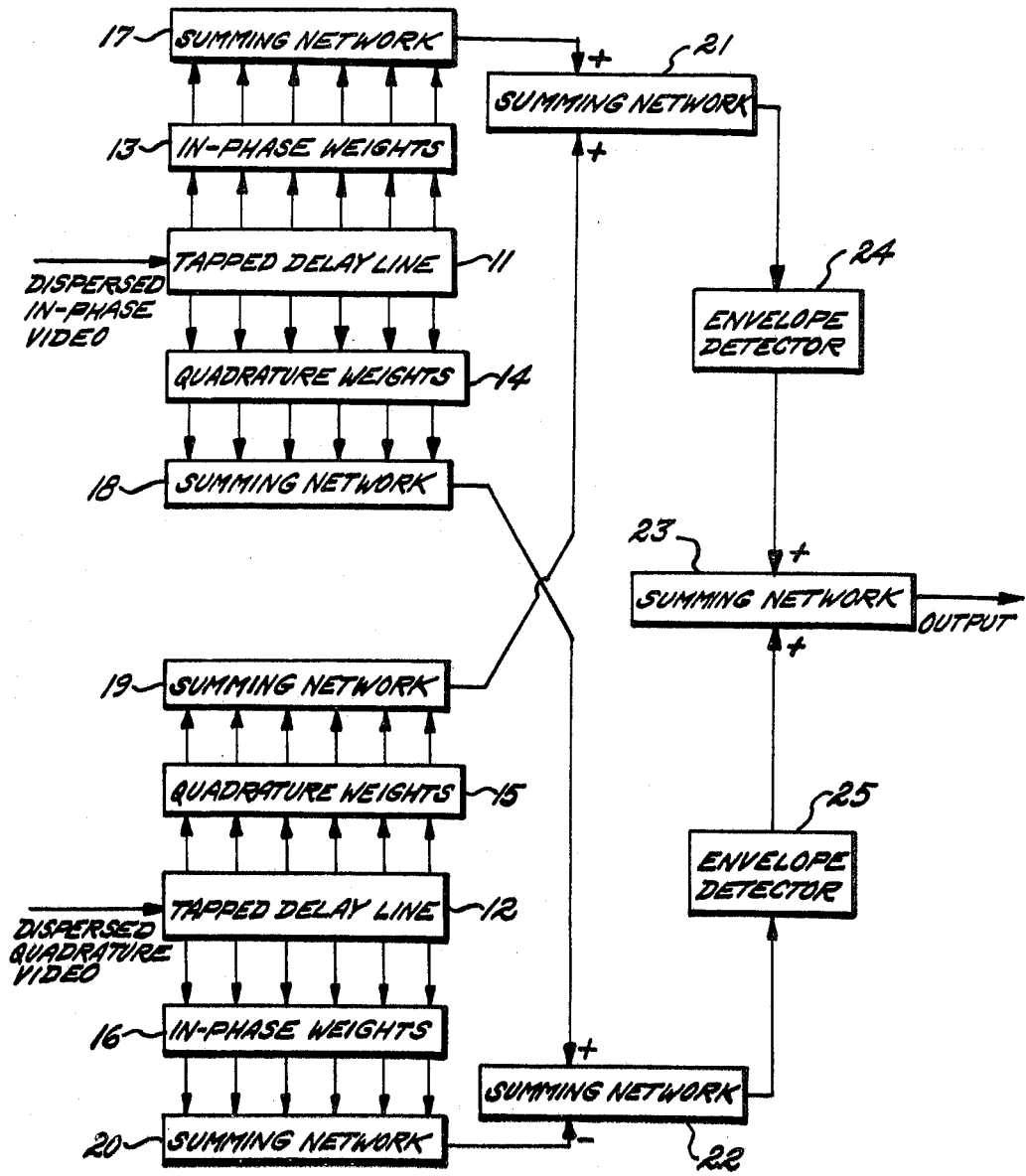
FIGURE 2 illustrates in block diagram form the video processor stage of the invention.

Because of the difficulties in implementing actual equipment, it is usually best to perform the correlation at video. In this case, two separate delay lines and four sets of tap weightings are required to perform a correlation free of spurious frequency fold over effects. The processor configuration for video correlation is shown in FIGURE 2. Both in-phase and quadrature signal channels are required, and both in-phase and quadrature tap weights are required. The tap weights for a video correlator are simple positive or negative amplitudes.

In operation dispersed in-phase video signals are delivered to tapped delay line 11 and resolution is achieved by in-phase weights 13 and quadrature weights 14. Summing network 17 receives and sums the output of in-phase weights 13. The output of summing network 17 comprises an in-phase compressed signal plus fold over spurious signals. Summing network 18 similarly provides a quadrature compressed signal minus fold over spurious signals. The dispersed quadrature video signals are delivered to tapped delay line 12 which, together with quadrature weights 15, in-phase weights 16 and summing networks 19 and 20 processes them. The output of summing network 19 is an in-phase compressed signal minus fold over spurious signals and the output of summing network 20 is a minus quadrature compressed signal minus fold over spurious signals. Summing network 21 sums the outputs of summing networks 17 and 19 and delivers the resultant signals to envelope detector 24. Summing network 22 sums the outputs of summing networks 18 and 20, and delivers the resultant signals to envelope detector 25. The outputs of envelope detectors 24 and 25 are again summed by summing network 23 to provide the processor output signals.

Figure 3:
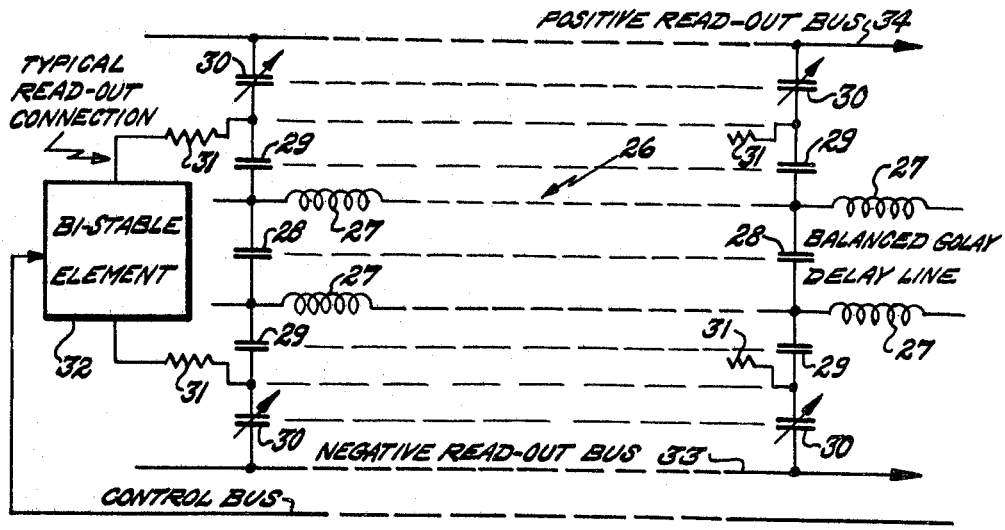
FIGURE 3 is a schematic diagram of the tap weight adaptor stage of the invention.

In certain instances, it is useful to have the capability for changing the complex weighting amplitudes at the output taps. For example, the shape of a pattern varies with frequency, and correlation of the various pattern shapes requires different filter characteristics. Hence under any circumstances in which variation in the pattern is expected, a corresponding variation in the amplitudes of the taps of the correlator must be effected. This can be achieved by obtaining a waveform in the shape of pattern, sending this waveform into the correlator, and having the correlator "photograph" the positive and negative amplitudes of the waveform when it just fills the correlator delay line. FIGURE 3 illustrates a means for achieving this. This approach uses a lumped constant delay of the type disclosed by M. J. E. Golay, in the publication The Ideal Low Pass Filter in the Form of a Dispersionless Lag Line, Proc. IRE, March 1946. Delay lines of this type containing several hundred taps have been successfully constructed and operated. These delay lines are small and, as will be seen in later discussions, would be able to provide correlation and beam steering signals for arrays of several hundred elements. Referring to FIGURE 3, the delay line 26 comprises the arrangement of inductors 27 and capacitors 28 illustrated. The delay line is connected to positive readout bus 34 and negative readout bus 33 through capacitors 29 and switching means comprising variable capacitors 30, resistors 31 and bistable element 32.

Each section of the line is tapped at positive and negative sides of the line, and switching elements connect these taps to the readout buses. When one switch is open, the other is closed, establishing either a positive or negative polarity at each tap. The sequence of positive or negative taps constitutes the code to which the delay line is set. To set the delay line a waveform obtained in the shape of the complex pattern is fed into the line. In the case of a video correlator as shown in FIGURE 2, this would be done in in-phase and quadrature channels. At the moment when this waveform fills the line, a pulse signal is sent through the control bus to activate the bistable element. Depending on whether a positive or negative signal exists at the tap, the switch at the positive or negative side of the line, respectively, is closed. The line in this condition will compress all received signals that are of the form of the test waveform. In the particular embodiment shown in FIGURE 3, the switches assume the form of variable capacitors 30 controlled by the bistable voltages $e_1$ and $e_2$. Since the bistable element 32 can be constructed with transistors and diodes, the switches can be controlled at nanosecond rates. The delay line taps can be reset at speeds compatible with the time required to fill the line with a new dispersed antenna waveform. The test wave forms are, of course, obtained from actual measurements of the various antenna patterns to be compressed. These can be stored on tapes, storage tubes, or other suitable storage media, and read out upon command.

Other types of correlators could be used to perform the pattern compression process. Important among these is the optical processor employing the ultrasonic light modulator. Unlike the tapped delay line which preferably operates at video, the optical processor can operate directly at IF.

While the invention has been described in its preferred embodiments, it is understood that the words which have been used are words of description rather than words of limitation and that changes within the purview of the appended claims may be made without departing from the scope and spirit of the invention in its broader aspects.

What is claimed is:
1. Radio direction finding apparatus comprising:
   a plurality of circularly arranged antenna elements,
   phase shifting means engaged to each said antenna element,
   an R.F. receiver,
   means connecting said antenna elements to said R.F. receiver,
   means for sequentially activating said phase shifting means, and
   signal correlating means connected to the output of said R.F. receiver.
2. Radio direction finding apparatus as defined in claim 1 wherein said phase shifting means comprises a binary phase shifter adapted to provide 0 and $\pi$ phase shifts.
3. Radio direction finding apparatus as defined in claim 2 wherein said means for sequentially activating said phase shifting means comprises a pulse sequence generator in combination with a tapped delay line.
4. Radio direction finding apparatus as defined in claim 3 wherein said pulse sequence generator effects sequential activation of said phase shifting means at a frequency adapted to provide cycling of said antenna array at rotational periods that are not more than the reciprocal of the signal bandwidth.
5. Radio direction finding apparatus as defined in claim 3 wherein said means for sequentially activating said phase shifting means is adapted to effect programmed pseudo-random shifting of said binary phase shifters.
6. Radio direction finding apparatus as defined in claim 4 wherein said signal correlating means comprises a tapped delay line having complex tap weights and a signal summing circuit.
7. Radio direction finding apparatus as defined in claim 6 including means for selectively changing the values of said complex tap weights.

References Cited

UNITED STATES PATENTS 3,054,105   9/1962   Steiner et al.     343—113
3,076,193   1/1963   Applebaum     343—118

RODNEY D. BENNETT, Jr., Primary Examiner

RICHARD E. BERGER, Assistant Examiner

U.S. Cl. X.R.

343—100, 113, 854